No. 871,234. PATENTED NOV. 19, 1907.
C. H. McINTOSH.
METHOD OF PRODUCING HALF TONE PLATES.
APPLICATION FILED FEB. 21, 1907.

Witnesses.
Lloyd Blackmore
P. Shee

Inventor.
C. H. McIntosh
by C. J. Fitherstonhaugh

UNITED STATES PATENT OFFICE.

CHARLES HAMILTON McINTOSH, OF MONTREAL, QUEBEC, CANADA.

METHOD OF PRODUCING HALF-TONE PLATES.

No. 871,234.      Specification of Letters Patent.      Patented Nov. 19, 1907.

Application filed February 21, 1907. Serial No. 358,600.

*To all whom it may concern:*

Be it known that I, CHARLES HAMILTON McINTOSH, a subject of the King of Great Britain, residing at 215 Peel street, in the city of Montreal, in the district of Montreal, in the Province of Quebec, in the Dominion of Canada, have invented certain new and useful Improvements in Methods of Producing Half-Tone Plates, of which the following is a specification.

My invention relates to improvements in methods of producing half tone plates, and the object of the invention is to cheapen the cost of production of good half tone plates by the elimination of the reëtching and hand tooling usual in the finishing of the plate, and it consists essentially in the steps set forth in detail in the present specification and particularly pointed out in the claims.

Figure 1:
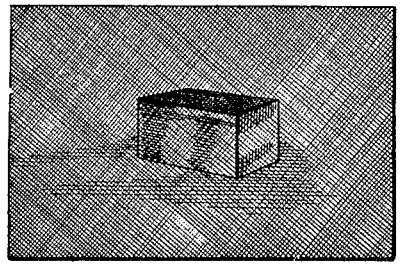
Figure 2:
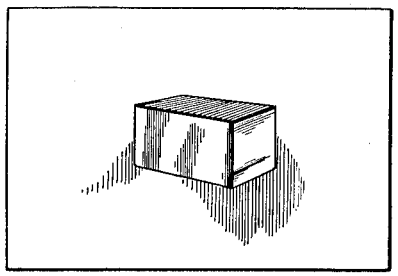
Figure 3:
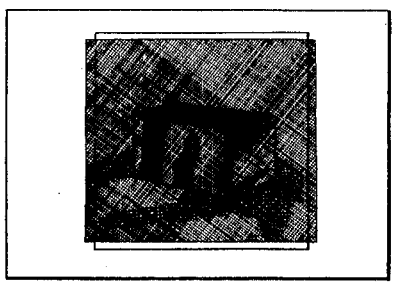

In the drawings, Figure 1 is a view of a rectangular plate of glass having the exposed and developed film taken through the ordinary line screen laid out thereon. Fig. 2 is a view showing a plain negative taken without the intervening screen. Fig. 3 is a view showing the developed and stripped film of the screen negative plate laid over the plain negative film and registering therewith as to the object appearing on the negatives.

It is well known in the art of photo-engraving that the negative of the object to be photographed and later to appear on the half tone plate is first taken on a wet plate through a plate of glass specially prepared and which is usually termed a half tone or line screen. This has the effect of producing the dots or relief necessary to effect a reproduction of the object from the half tone plate. It is necessary in order to faithfully reproduce the high lights and shadows to reëtch and hand tool the metal plate, that receives the print from the negative taken through the screen following the preliminary etching in the iron bath, and it is with the elimination of the time necessary to accomplish the reëtching and hand tooling that this invention has to do.

The common practice in the production of half tones is first to prepare the plate and camera and take a negative of the object to be photographed through a half tone line screen, that is to say, a transparent plate lined and cross lined throughout its entire surface. The next step in the method differs materially from the fact that a negative from the object to be photographed is taken without the intervening screen and which hereinafter will be known as the "plain negative" while the first will be termed the "screen negative" for convenience in description. Following the proper exposure of the plate for the "plain negative" and the subsequent development, the film is stripped from its glass plate and laid on to a plate of clear glass for printing purposes. The film forming the "screen negative" which has been developed, is now stripped from its plate and laid over the film of the "plain negative" on the printing glass plate aforesaid. The said film forming the "screen negative" has completely therethroughout a reproduction of the lines and cross lines in the half tone screen and from these the necessary relief dots are obtained in the after steps of the method. It is now essential that the "screen negative" shall register in every line of the object photographed with the plain negative and to do this properly, the plain negative must have been sufficient time on the printing glass plate to adhere closely thereto and permit the moving of the screen negative over its surface by methods well known to those skilled in the art. The surface of the metal plate is then prepared in the usual manner and the registered films placed thereagainst and the whole inclosed in a frame and printed, then the metal plate is submerged in an iron bath as customary in the etching step of the usual half tone process.

The introduction of the plain negative under the screen negative has the effect of bringing out the high lights and deepening the shadows as the opacity of the plain negative at parts reduces the effect of the screen dots on the screen negative and similarly the transparency of some parts of the plain negative permits the clear exposure of that part of the screen negative.

The facility with which the dots disappear in the preliminary etching and which is the final etching in this method is remarkable and renders it quite unnecessary to reëtch the metal plate or hand tool it, and in fact it may be said that the first and final etching in this method is the final step beyond the ordinary cleaning up of the plate.

It may be advisable in the reproduction of some objects to superimpose the "plain negative" on the "screen negative" on the printing glass, but the preferable way of carrying out my method is to superimpose the "screen negative" on the "plain negative". Further in some pictures in making the plate for the reproduction of the same, it may improve the method herein described to have two or more "plain negatives" with a "screen negative" or two or more "screen negatives" with "plain negatives" or a plurality of both, the feature of the invention being the combining of the "plain negative" with the usual half tone "screen negative" in the operation of printing on to the prepared plate.

The order of the steps as herein set forth is not important in this process, except in so far as necessity calls for the stripping of the films from the plates after the making of the negatives and the etching subsequent to the printing on the metal, but the making of either one of the negatives before the other is not important as also the stripping of either one of the films.

What I claim as my invention is:

1. A method of producing half tone plates, consisting in first fully exposing a plate covered with a sensitive film to the object to be photographed through an intervening prepared screen and producing a "screen negative", then exposing a plate covered with a sensitive film to the object to be photographed without having any intervening screen and producing a "plain negative", then stripping the screen negative of said object having all high lights, middle tones and shadows clearly shown from its plate, then superimposing the said "screen negative" on the "plain negative" and registering the lines of the object photographed of the one negative with the other, then preparing a metal plate, then printing the negatives so arranged on to said metal plate and finally submerging said prepared plate in a bath and etching, as specified.

2. A method of producing half tone plates, consisting in first fully exposing a wet photographic plate to the object to be photographed through an intervening glass screen having lines arranged throughout its surface and developing the same and producing the screen or half tone negative, then fully exposing a wet photographic plate to the object to be photographed without any intervening screen and developing said plate after exposure and producing the plain negative properly and clearly showing all details of the picture, then stripping the film of said "plain negative" from its plate and laying it on a transparent printing base, then stripping the film of the "screen negative" from its plate and laying it over the film forming the "plain negative" and registering the lines of the object photographed on the two films, then preparing the metal plate, then printing the object photographed on the negatives on to the metal plate and finally etching by submersion, as specified.

3. In a method of producing half tone plates, the superimposition of the fully exposed "screen negative" on the fully exposed "plain negative" and the registration of the lines of the object photographed of the one negative with the lines of the other and the subsequent printing of the object photographed from the negatives so arranged, as specified.

Signed at the city of Montreal, in the District of Montreal, in the Province of Quebec, in the Dominion of Canada, this 14th day of February, 1907.

CHARLES HAMILTON McINTOSH.

Witnesses:
 LLOYD BLACKMORE,
 G. H. TRESIDDER.